US012661987B2

(12) United States Patent
Babu et al.

(10) Patent No.: US 12,661,987 B2
(45) Date of Patent: Jun. 23, 2026

(54) VEHICLE DEPLOYABLE CONTROL FOR AUTOMATED VEHICLES

(71) Applicant: GM Global Technology Operations LLC, Detroit, MI (US)

(72) Inventors: Kiran Babu, Detroit, MI (US); Kyle Reimer, Royal Oak, MI (US); Joseph F. Szczerba, Grand Blanc, MI (US); Gregory Ward, Grand Rapids, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 73 days.

(21) Appl. No.: 18/894,371

(22) Filed: Sep. 24, 2024

(65) Prior Publication Data

US 2026/0084530 A1 Mar. 26, 2026

(51) Int. Cl.
B60K 35/53 (2024.01)
B60K 35/10 (2024.01)
B60K 35/22 (2024.01)
B60K 35/25 (2024.01)

(52) U.S. Cl.
CPC .............. B60K 35/53 (2024.01); B60K 35/10 (2024.01); B60K 35/22 (2024.01); B60K 35/25 (2024.01); *B60K 2360/1434* (2024.01)

(58) Field of Classification Search
CPC ........ B60K 35/53; B60K 35/10; B60K 35/22; B60K 35/25; B60K 2360/1434
USPC .......................................................... 701/2
See application file for complete search history.

(56) References Cited

U.S. PATENT DOCUMENTS

| | | | | |
|---|---|---|---|---|
| 5,182,557 A | * | 1/1993 | Lang ...................... | B25J 9/0003 |
| | | | | 341/20 |
| 5,903,229 A | * | 5/1999 | Kishi .................. | G06F 3/04847 |
| | | | | 341/20 |
| 6,663,155 B1 | * | 12/2003 | Malone ............... | B60R 11/0229 |
| | | | | 224/539 |
| 8,162,395 B2 | * | 4/2012 | Vitito .................... | B60N 2/879 |
| | | | | 297/217.3 |
| 8,891,027 B2 | * | 11/2014 | Chen ................... | B60R 11/0223 |
| | | | | 348/837 |
| 9,007,447 B2 | * | 4/2015 | Wohrle ............... | B60R 11/0235 |
| | | | | 348/61 |
| 9,457,642 B2 | * | 10/2016 | Kothari .................... | B60R 1/24 |
| 9,933,820 B2 | * | 4/2018 | Hélot ................... | G06F 1/1643 |

(Continued)

*Primary Examiner* — Luis A Martinez Borrero
(74) *Attorney, Agent, or Firm* — CANTOR COLBURN LLP

(57) ABSTRACT

An apparatus for operation of an autonomous vehicle is disclosed. A deployment mechanism is coupled to a convertible interface. The convertible interface includes a rod having a first end and a second end, a touch-sensitive surface connected to the rod at the first end, and a universal joint connected to the rod at the second end, wherein the rod is configured to rotate about the universal joint. The deployment mechanism is configured to move the convertible interface between a first position and a second position. In the first position, the touch-sensitive surface receives a command when an operator moves a pointing device along the touch-sensitive surface in a gesture that indicates the command. In the second position, the convertible interface receives the command when the operator moves the touch-sensitive surface to cause a rotation at the universal joint that indicates the command.

20 Claims, 12 Drawing Sheets

(56)          References Cited

U.S. PATENT DOCUMENTS

| | | | | |
|---|---|---|---|---|
| 10,007,475 B2 * | 6/2018 | Jeon | G06F 3/04817 | |
| 10,222,825 B2 * | 3/2019 | Wang | H05K 5/30 | |
| 10,500,958 B2 * | 12/2019 | Cho | B60K 35/60 | |
| 10,509,613 B2 * | 12/2019 | Soh | B60K 35/10 | |
| 10,647,264 B2 * | 5/2020 | Forsgren | B60R 11/0235 | |
| 10,671,271 B2 * | 6/2020 | Chion | B60K 35/10 | |
| 11,106,358 B2 * | 8/2021 | Yoon | G06F 1/1694 | |
| 11,614,796 B1 * | 3/2023 | Summit | A63F 13/245 | 345/633 |
| 11,660,963 B2 * | 5/2023 | Benjamin | B60K 35/22 | 156/382 |
| 11,697,346 B1 * | 7/2023 | Weiss | G02B 27/0093 | 345/589 |
| 11,762,473 B2 * | 9/2023 | Cipoletta | G06F 1/163 | 701/2 |
| 11,766,938 B1 * | 9/2023 | Weiss | G02B 27/0101 | 345/589 |
| 11,768,369 B2 * | 9/2023 | Kim | C03C 17/09 | 428/192 |
| 11,885,761 B2 * | 1/2024 | An | G01N 27/20 | |
| 12,039,900 B1 * | 7/2024 | Sharma | G02B 27/0012 | |
| 12,091,357 B2 * | 9/2024 | Gross | G06F 1/1652 | |
| 12,254,146 B2 * | 3/2025 | Saito | G06F 1/1652 | |
| 12,360,564 B2 * | 7/2025 | Helot | B60K 35/223 | |
| 12,466,756 B2 * | 11/2025 | Burdette | B32B 3/08 | |
| 2007/0057781 A1 * | 3/2007 | Breed | B60K 35/22 | 340/457.1 |
| 2009/0232299 A1 * | 9/2009 | Demuynck | H04M 1/0247 | 455/575.4 |
| 2010/0016038 A1 * | 1/2010 | Demuynck | H04M 1/0216 | 361/679.04 |
| 2010/0037428 A1 * | 2/2010 | Gaddy | H04M 1/0247 | 16/366 |
| 2010/0073291 A1 * | 3/2010 | Hisatsugu | G06F 3/03548 | 345/184 |
| 2010/0253539 A1 * | 10/2010 | Seder | G01C 21/365 | 340/902 |
| 2011/0071717 A1 * | 3/2011 | Lenneman | B60R 16/005 | 701/23 |
| 2012/0173067 A1 * | 7/2012 | Szczerba | B60K 35/10 | 701/1 |
| 2012/0268665 A1 * | 10/2012 | Yetukuri | B60K 35/22 | 348/837 |
| 2013/0021762 A1 * | 1/2013 | van Dijk | G09F 9/301 | 361/749 |
| 2013/0241720 A1 * | 9/2013 | Ricci | B60K 35/10 | 715/765 |
| 2014/0091604 A1 * | 4/2014 | Chatrenet | B64D 43/00 | 297/217.3 |
| 2015/0002398 A1 * | 1/2015 | Nakhimov | G06F 1/1652 | 345/173 |
| 2016/0041562 A1 * | 2/2016 | Mathieu | B60W 50/14 | 701/2 |
| 2016/0259365 A1 * | 9/2016 | Wang | G06F 1/1601 | |
| 2017/0060249 A1 * | 3/2017 | Scheufler | G06F 3/0482 | |
| 2017/0083047 A1 * | 3/2017 | Hélot | B60K 35/10 | |
| 2017/0168769 A1 * | 6/2017 | Jeon | G06F 1/1652 | |
| 2018/0304749 A1 * | 10/2018 | Cho | B60K 35/60 | |
| 2019/0012003 A1 * | 1/2019 | Grant | G06F 3/0312 | |
| 2019/0337388 A1 * | 11/2019 | Hélot | B60K 35/10 | |
| 2020/0125228 A1 * | 4/2020 | Chion | G06F 3/0485 | |
| 2020/0225848 A1 * | 7/2020 | Yoon | G06F 3/041 | |
| 2020/0238824 A1 * | 7/2020 | Park | G06F 3/013 | |
| 2021/0158783 A1 * | 5/2021 | Lee | G09G 3/2003 | |
| 2021/0206266 A1 * | 7/2021 | Shim | B60K 35/223 | |
| 2022/0121346 A1 * | 4/2022 | Kim | G06F 1/1624 | |
| 2022/0351656 A1 * | 11/2022 | George Philip | G06F 1/1652 | |
| 2022/0368784 A1 * | 11/2022 | Koh | H04M 1/0235 | |
| 2023/0085791 A1 * | 3/2023 | Cowburn | G01C 21/3626 | 701/428 |
| 2023/0135972 A1 * | 5/2023 | Szczerba | B60K 35/10 | 701/36 |
| 2023/0176720 A1 * | 6/2023 | Cheon | G06F 1/1624 | 345/173 |
| 2023/0219415 A1 * | 7/2023 | Glaser | G08C 17/02 | 340/438 |
| 2023/0259268 A1 * | 8/2023 | Chun | G06F 3/0481 | 715/781 |
| 2023/0375829 A1 * | 11/2023 | Seder | G02B 27/0101 | |
| 2024/0054708 A1 * | 2/2024 | Zhang | G06F 1/1677 | |
| 2024/0199224 A1 * | 6/2024 | Cole | G06F 3/0488 | |
| 2024/0241546 A1 * | 7/2024 | Hsieh | G06F 1/1654 | |
| 2024/0242648 A1 * | 7/2024 | Kim | G06F 1/1624 | |
| 2024/0329687 A1 * | 10/2024 | Dutta Choudhury | G06F 1/1624 | |
| 2024/0365487 A1 * | 10/2024 | Helot | G06F 3/1446 | |
| 2024/0385436 A1 * | 11/2024 | Dehkordi | G02B 27/0101 | |
| 2024/0411445 A1 * | 12/2024 | Kang | H04M 1/0235 | |
| 2025/0362145 A1 * | 11/2025 | Seder | G01C 21/365 | |
| 2026/0027896 A1 * | 1/2026 | Reimer | B60K 35/10 | |

* cited by examiner 204          208                                    300
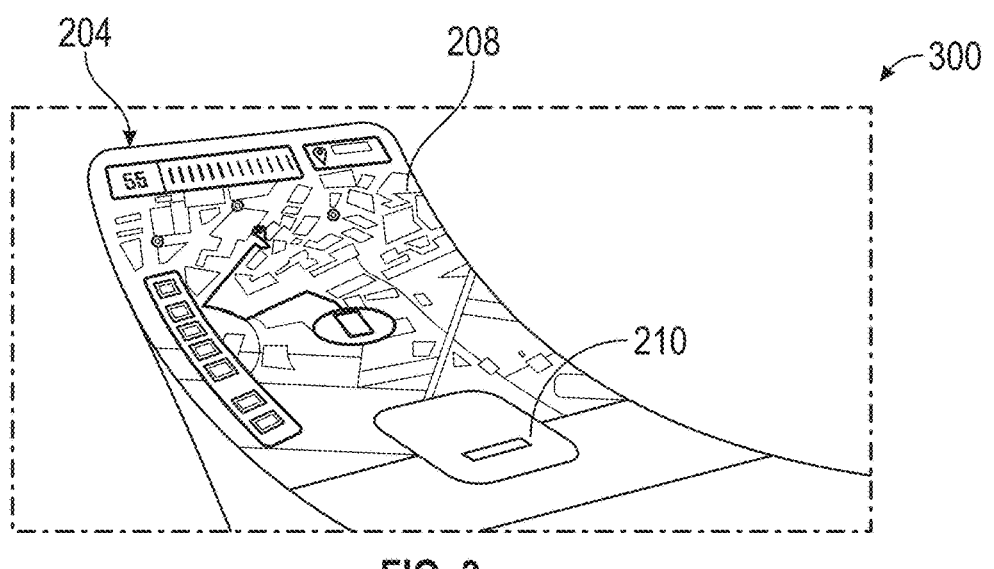
210
FIG. 3
204          208                                    400
210
402
FIG. 4
204          208                                    500
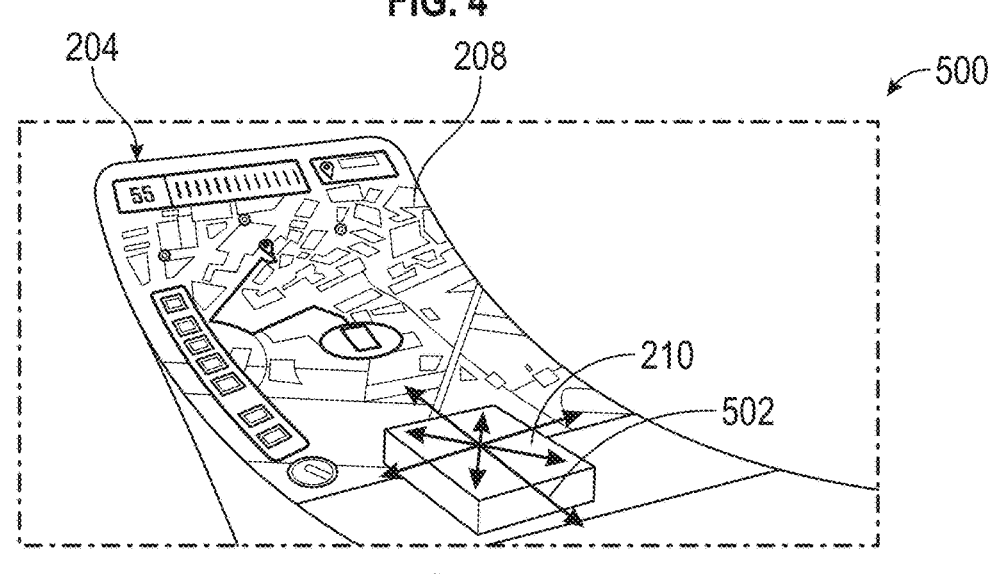
210
502
FIG. 5

VEHICLE DEPLOYABLE CONTROL FOR AUTOMATED VEHICLES

The subject disclosure relates to automated vehicles and, in particular, to an interface for controlling the operation of an automated vehicle.

Ideally, an autonomous vehicle can control itself without receiving input from a driver or operator. However, the driver may wish to enter a command or steering input that is more in line with his intentions or desires. While the driver can employ a steering wheel, accelerator and/or brake pedal, being tied to these devices can require the driver to be in an attentive position even during moments when the autonomous vehicle is operating on its own. Accordingly, it is desirable to provide an interface for entering commands into the autonomous vehicle that allows more freedom to the driver or operator.

SUMMARY

In one exemplary embodiment, an apparatus for operation of an autonomous vehicle is disclosed. The apparatus includes a convertible interface and a deployment mechanism coupled to the convertible interface. The convertible interface includes a rod having a first end and a second end, a touch-sensitive surface connected to the rod at the first end, and a universal joint connected to the rod at the second end, wherein the rod is configured to rotate about the universal joint. The deployment mechanism is configured to move the convertible interface between a first position and a second position. In the first position, the touch-sensitive surface receives a command when an operator moves a pointing device along the touch-sensitive surface in a gesture that indicates the command. In the second position, the convertible interface receives the command when the operator moves the touch-sensitive surface to cause a rotation at the universal joint that indicates the command.

In addition to one or more of the features described herein, the touch-sensitive surface is flush with a display surface of a human machine interface when the convertible interface in the first position and the touch-sensitive surface is raised to a selected distance above the display surface when the convertible interface in the second position.

In addition to one or more of the features described herein, the apparatus further includes a haptic actuator coupled to the universal joint for generating a haptic signal to acknowledge receipt of the command from the operator.

In addition to one or more of the features described herein, the touch-sensitive surface is turned on when the convertible interface is in the first position and is turned off when the convertible interface is in the second position.

In addition to one or more of the features described herein, the apparatus further includes a potentiometer configured to generate a signal in response to the rotation of the universal joint about an axis, wherein the signal is indicative of the command.

In addition to one or more of the features described herein, the apparatus further includes a processor configured to perform a maneuver at the autonomous vehicle indicated by the command entered at the convertible interface.

In addition to one or more of the features described herein, the apparatus further includes a communication device for sending signals between the processor and a remote communication device, wherein the operator can enter the command at the remote communication device.

In another exemplary embodiment, a human machine interface for an autonomous vehicle is disclosed. The human machine interface includes a display surface having a screen, a convertible interface movable with respect to the display surface, and a deployment mechanism coupled to the convertible interface. The convertible interface includes a rod having a first end and a second end, a touch-sensitive surface connected to the rod at the first end, and a universal joint connected to the rod at the second end. The rod is configured to rotate about the universal joint. The deployment mechanism is configured to move the convertible interface between a first position and a second position. In the first position, the touch-sensitive surface receives a command when an operator moves a pointing device along the touch-sensitive surface in a gesture that indicates the command. In the second position, the convertible interface receives the command when the operator moves the touch-sensitive surface to cause a rotation at the universal joint that indicates the command.

In addition to one or more of the features described herein, the touch-sensitive surface is flush with a display surface of a human machine interface when the convertible interface in the first position and the touch-sensitive surface is raised to a selected distance above the display surface when the convertible interface in the second position.

In addition to one or more of the features described herein, the human machine interface further includes a haptic actuator coupled to the universal joint for generating a haptic signal to acknowledge receipt of the command from the operator.

In addition to one or more of the features described herein, the touch-sensitive surface is turned on when the convertible interface is in the first position and is turned off when the convertible interface is in the second position.

In addition to one or more of the features described herein, the human machine interface further includes a potentiometer configured to generate a signal in response to the rotation of the universal joint about an axis, wherein the signal is indicative of the command.

In addition to one or more of the features described herein, the human machine interface further includes a communication device for sending signals between a processor of the autonomous vehicle and a remote communication device, wherein the operator can enter the command at the remote communication device.

In addition to one or more of the features described herein, the screen is touch sensitive for receiving the command from the operator.

In yet another exemplary embodiment, a vehicle is disclosed. The vehicle includes a processor and a human machine interface. The processor is configured to control an operation of the vehicle based on a command from an operator. The human machine interface is configured to receive the command from the operator. The human machine interface includes a display surface having a screen, a convertible interface movable with respect to the display surface and a deployment mechanism coupled to the convertible interface.

The convertible interface includes a rod having a first end and a second end, a touch-sensitive surface connected to the rod at the first end, and a universal joint connected to the rod at the second end, wherein the rod is configured to rotate about the universal joint. The deployment mechanism is configured to move the convertible interface between a first position and a second position. In the first position, the touch-sensitive surface receives the command when an operator moves a pointing device along the touch-sensitive surface in a gesture that indicates the command. In the second position, the convertible interface receives the command when the operator moves the touch-sensitive surface to cause a rotation at the universal joint that indicates the command.

In addition to one or more of the features described herein, the touch-sensitive surface is flush with a display surface of a human machine interface when the convertible interface in the first position and the touch-sensitive surface is raised to a selected distance above the display surface when the convertible interface in the second position.

In addition to one or more of the features described herein, the vehicle further includes a haptic actuator coupled to the universal joint for generating a haptic signal to acknowledge receipt of the command from the operator.

In addition to one or more of the features described herein, the touch-sensitive surface is turned on when the convertible interface is in the first position and is turned off when the convertible interface is in the second position.

In addition to one or more of the features described herein, the vehicle further includes a potentiometer configured to generate a signal in response to the rotation of the universal joint about an axis, wherein the signal is indicative of the command.

In addition to one or more of the features described herein, the vehicle further includes a communication device for sending signals between the processor and a remote communication device, wherein the operator can enter the command at the remote communication device.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 shows a perspective view of the human machine interface operating in a first mode of operation;

FIG. 4 shows a perspective view of the human machine interface as it transitions between modes of operation;

FIG. 5 shows a perspective view of the human machine interface in a second mode of operation;

DETAILED DESCRIPTION

Figure 1:
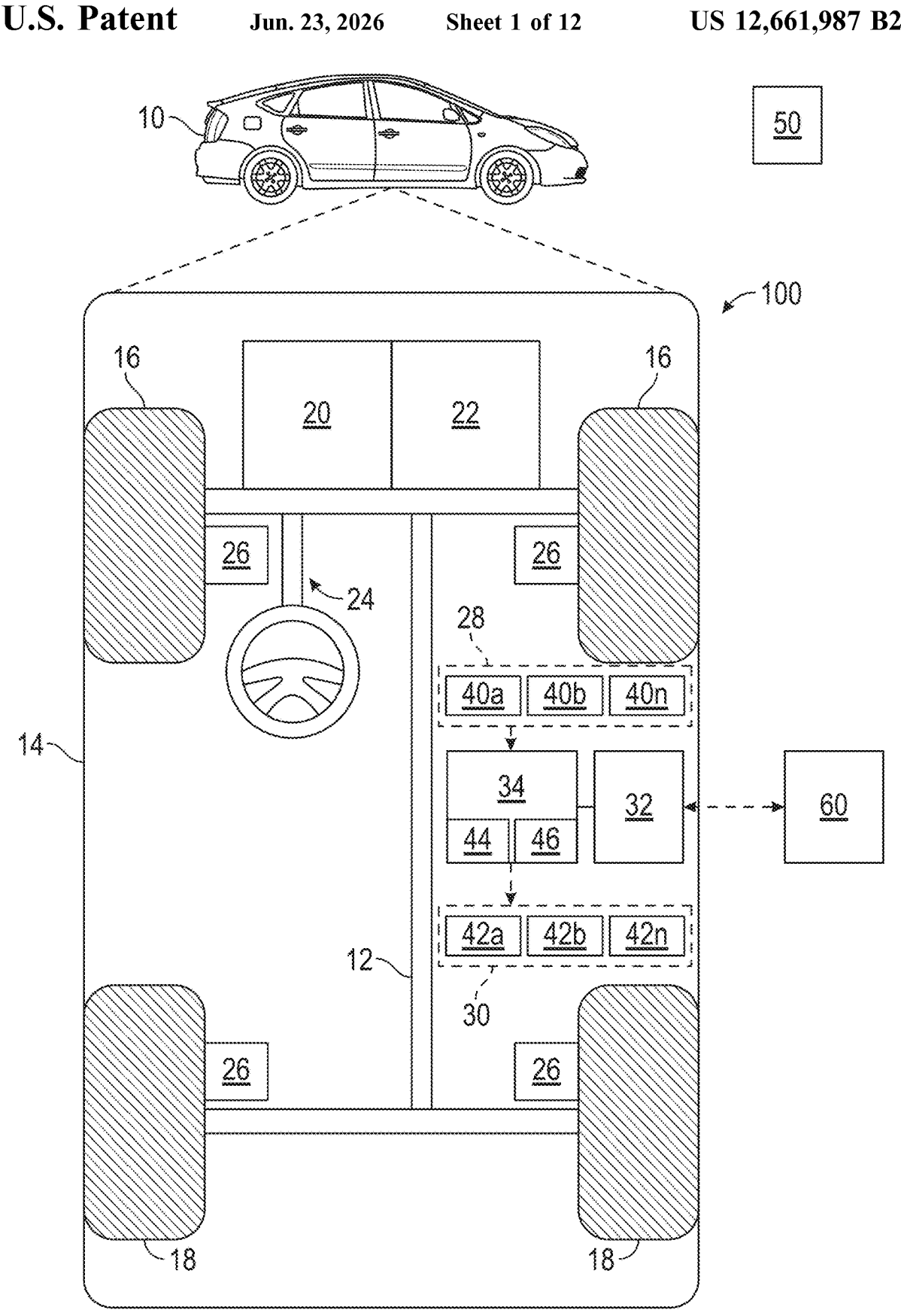
FIG. 1 shows an autonomous vehicle with an associated trajectory planning system depicted at in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an autonomous vehicle 10 with an associated trajectory planning system depicted at 100. In general, the trajectory planning system 100 determines a trajectory plan for automated driving of the autonomous vehicle 10. The autonomous vehicle 10 generally includes a chassis 12, a body 14, front wheels 16, and rear wheels 18. The body 14 is arranged on the chassis 12 and substantially encloses components of the autonomous vehicle 10. The body 14 and the chassis 12 may jointly form a frame. The front wheels 16 and rear wheels 18 are each rotationally coupled to the chassis 12 near respective corners of the body 14.

In various embodiments, the trajectory planning system 100 is incorporated into the autonomous vehicle 10. The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. At various levels, an autonomous vehicle can assist the driver through a number of methods, such as warning signals to indicate upcoming risky situations, indicators to augment situational awareness of the driver by predicting movement of other agents warning of potential collisions, etc. The autonomous vehicle has different levels of intervention or control of the vehicle through coupled assistive vehicle control all the way to full control of all vehicle functions. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, a communication device 32, and a controller 34. The propulsion system 20 may, in various embodiments, include an internal combustion engine, an electric machine such as a traction motor, and/or a fuel cell propulsion system. The transmission system 22 is configured to transmit power from the propulsion system 20 to the front wheels 16 and rear wheels 18 according to selectable speed ratios. According to various embodiments, the transmission system 22 may include a step-ratio automatic transmission, a continuously variable transmission, or other appropriate transmission. The brake system 26 is configured to provide braking torque to the front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The sensing devices 40a-40n obtain measurements or data related to various objects or agents 50 within the vehicle's environment. Such agents 50 can be, but are not limited to, other vehicles, pedestrians, bicycles, motorcycles, etc., as well as non-moving objects. The sensing devices 40a-40n can also obtain traffic data, such as information regarding traffic signals and signs, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but not limited to, doors, a trunk, and cabin features such as ventilation, music, lighting, etc. (not numbered).

The controller 34 includes a processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms.

The communication device 32 can control signal communication between the controller 34 and a remote communication device 60. In various embodiments, the remote communication device 60 can be a portable device such as a smartphone. The remote communication device 60 can be in the possession of a passenger, driver, occupant, or operator of the autonomous vehicle and can therefore be conveyed within the autonomous vehicle 10. The operator can enter a command to the autonomous vehicle 10 using the remote communication device 60.

Figure 2:
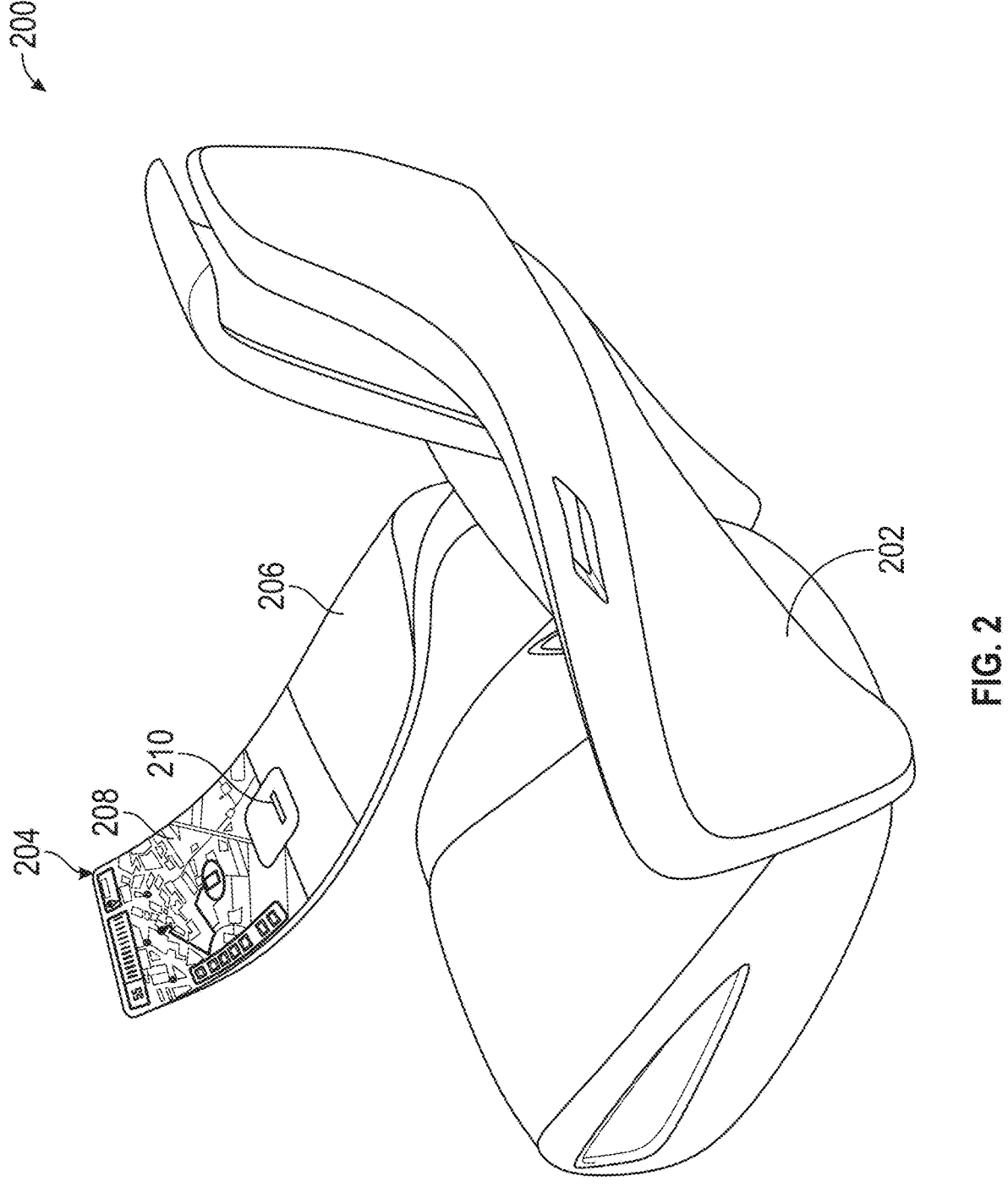
FIG. 2 shows a control center for the autonomous vehicle, in an illustrative embodiment.

FIG. 2 shows a control center 200 for the autonomous vehicle 10, in an illustrative embodiment. The control center 200 includes a seat 202 for an operator such as a driver, a passenger, etc. The seat 202 includes a human machine interface 204 for allowing an operator to control the autonomous vehicle 10. In an embodiment, the human machine interface 204 can be attached to an arm rest 206 of the seat 202. The human machine interface 204 includes a display 208 and a convertible interface 210. The display 208 shows information for viewing by the operator and for receiving various commands from the operator. The convertible interface 210 is a device that can be operated in at least two modes to receive input from the operator. The convertible interface 210 includes a touchpad on its upper surface that can be used for touch data entry in a first mode of operation. In a second mode of operation, the convertible interface 210 can be used as a joystick for data entry by motion of the joystick through space.

FIG. 3 shows a perspective view 300 of the human machine interface 204 operating in a first mode of operation. The convertible interface 210 acts as a touch screen that allows the operator to input commands to the vehicle by performing a gesture at the touch pad, such as by dragging his finger across touchpad, tapping the touchpad screen, touching an icon shown at the touchpad, etc. In the first mode, the convertible interface 210 is generally flush with the surface of the display 208.

FIG. 4 shows a perspective view 400 of the human machine interface 204 as it transitions between modes of operation. The convertible interface 210 can be raised or lowered in a direction perpendicular to the surface of the display 208.

FIG. 5 shows a perspective view 500 of the human machine interface 204 in a second mode of operation. The convertible interface 210 is raised above the display 208 and acts as a joystick. The operator inputs commands to the vehicle by physically moving the joystick in a given direction, such as shown by direction arrow 502. The direction arrows indicate a spatial motion in a left-right direction which corresponds to a rotation at the universal joint about a first axis of rotation. Also, the joystick can move in a forward-backward direction which corresponds to a rotation at the universal joint about a second axis of rotation.

Figure 6:
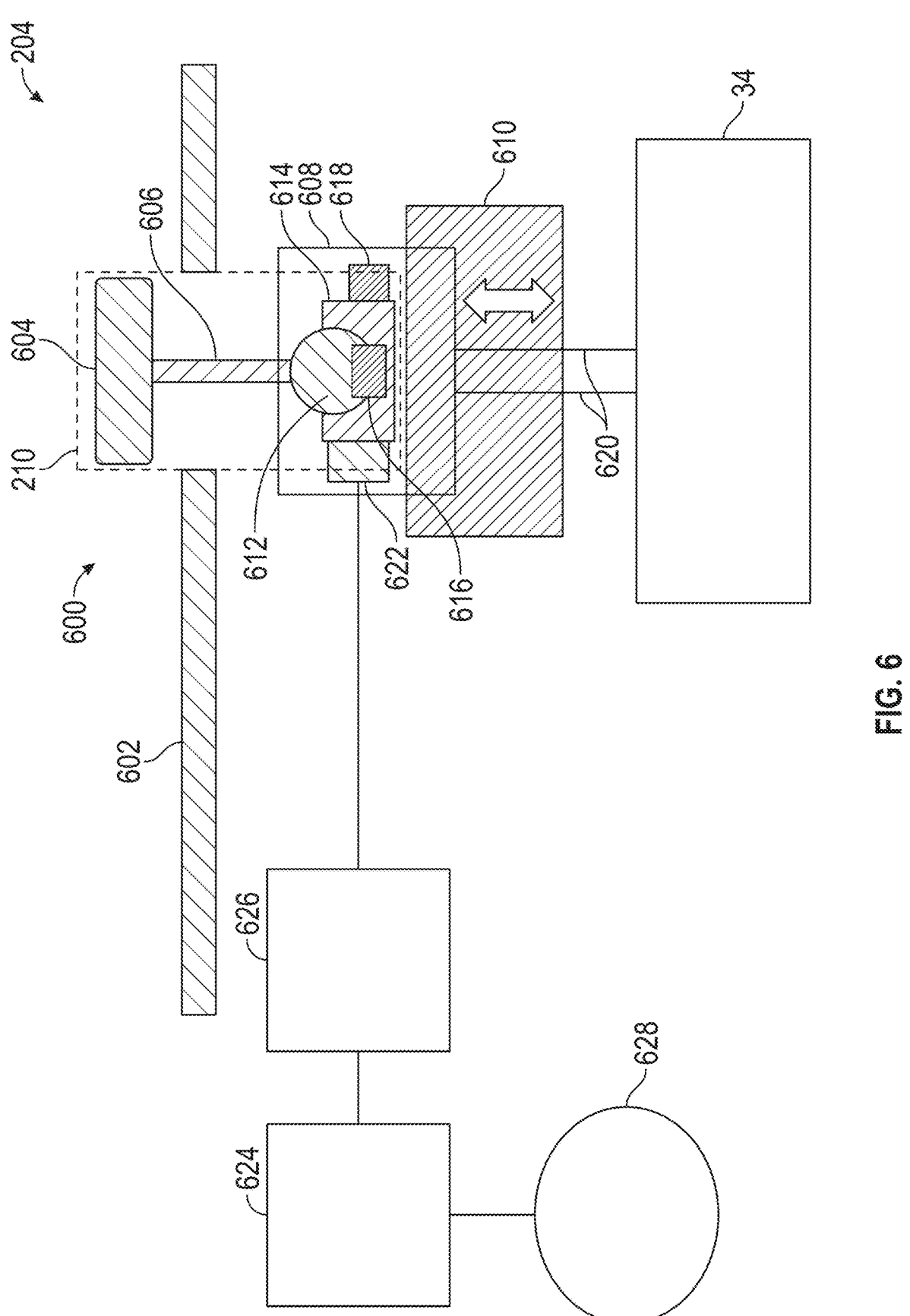
FIG. 6 is a side view showing internal components of the human machine interface, in an embodiment.

FIG. 6 is a side view 600 showing internal components of the human machine interface 204, in an embodiment. The side view 600 shows a display surface 602 and the convertible interface 210. The convertible interface 210 includes a touchpad or touch-sensitive surface 604, a rod 606 and a universal joint 608 or some rotational joint for suitable rotation about three axes. The touch-sensitive surface 604 is connected to the universal joint 608 via the rod 606. The touch-sensitive surface 604 is located at a first end of the rod 606, and the universal joint 608 is connected to a second end of the rod. The universal joint 608 therefore provides a rotation point about which the touch-sensitive surface 604 can rotate.

The universal joint 608 is disposed on a deployment mechanism 610 that can raise and lower the convertible interface 210 (including universal joint 608, rod 606 and touch-sensitive surface 604). The deployment mechanism 610 can be a linear actuator that moves the convertible interface 210 between a first position and a second position. The linear actuator can be an electric motor or a mechanical spring with a dampener or any other suitable mechanism for linear actuation of the convertible interface 210. The first position is generally lower than the second position, and the deployment mechanism 610 raises and lowers the convertible interface 210, depending on which mode of operation is being used.

In the first position, the convertible interface 210 is flush with display surface 602 and is maintained in place with respect to the display surface 602. In this position, the touch-sensitive surface 604 is turned on so that commands can be entered by the operator touching the screen with a finger or other suitable pointing device.

In the second position, the convertible interface 210 is located a selected distance above the display surface 602 and the touch-sensitive surface 604 rotates about the universal joint 608 (i.e., as a joystick). The touch-sensitive surface 604 can be turned off when the convertible interface 210 is in the second position in order to prevent entry of a command by the operator's touch. A command is entered when the operator grabs the touch-sensitive surface 604 at moves it in a suitable direction (e.g., left right, forward, backward) to cause a rotation at the universal joint 608.

The universal joint 608 includes a ball 612 rotatable within a socket 614. The socket 614 includes a first potentiometer 616 and a second potentiometer 618. The first potentiometer 616 is sensitive to a rotation of the ball 612 along a first axis (i.e., an x-axis). The second potentiometer 618 is sensitive to rotation of the ball 612 along a second axis (i.e., a y-axis). Electrical signals from the first potentiometer 616 and the second potentiometer 618 can be sent via wires 620 to the controller 34 for controlling one or more driver motors. The electrical signals indicate the intention of the operator as transmitted through the convertible interface 210 operating as a joystick.

A haptic actuator 622 is connected to the universal joint 608. The haptic actuator 622 can be activated to generate a vibration at the universal joint 608 that can be sensed by the operator with his hand on the convertible interface 210. A microcontroller 624 is connected to a haptic driver 626. The haptic driver 626 is in communication with the haptic actuator 622 and can send a signal to activate the haptic actuator. The microcontroller 624 can receive signals from sensors of the vehicle. In an embodiment, the microcontroller 624 confirms a receipt of a command from the operator via the convertible interface 210 and sends a confirmation signal to the haptic driver 626. Upon receipt of the confirmation signal, the haptic driver 626 operates the haptic actuator 622 to generate the haptic signal to confirm receipt of the command.

Figures 7, 8:
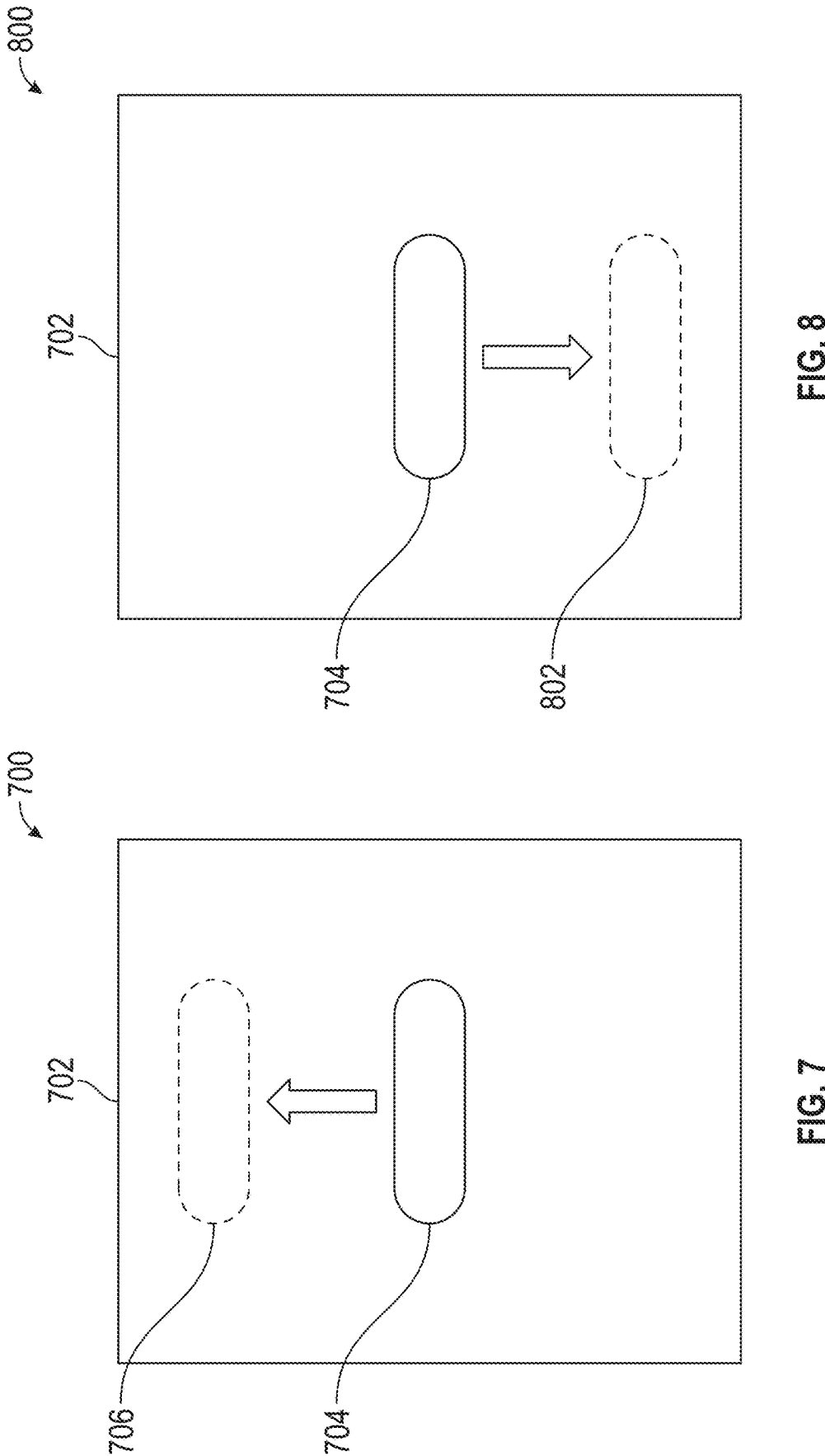
FIG. 7 shows a head-on view of a screen of the convertible interface illustrating entry of an acceleration command when the convertible interface is operating in a touch mode.
FIG. 8 shows a head-on view of the screen illustrating entry of a deceleration command when the convertible interface is operating in a touch mode.

FIG. 7 shows a head-on view 700 of a screen 702 of the convertible interface 210 illustrating entry of an acceleration command when the convertible interface 210 is operating in a touch mode (i.e., the first mode). A position icon 704 is displayed and allows the operator to enter a command. A default position of the position icon 704 (i.e., while waiting for a command to be entered) is located in the center of the screen 702. The operator places his finger on the position icon 704 and slides his finger forward (for example, to the location shown by outline 706) in order to enter a command for increasing a speed of the autonomous vehicle 10. The amount of acceleration is related to an amount by which the operator moves the position icon 704 forward in the screen 702. This command is provided to the controller 34.

FIG. 8 shows a head-on view 800 of the screen 702 illustrating entry of a deceleration command when the convertible interface 210 is operating in a touch mode. The operator places his finger on the position icon 704 and slides his finger backward (for example, to the location shown by outline 802) in order to decrease a speed of the vehicle. A command for decelerating the vehicle is related to an amount by which the operator moves the position icon 704 backward in the screen 702. This command is provided to the controller 34.

Figures 9, 10:
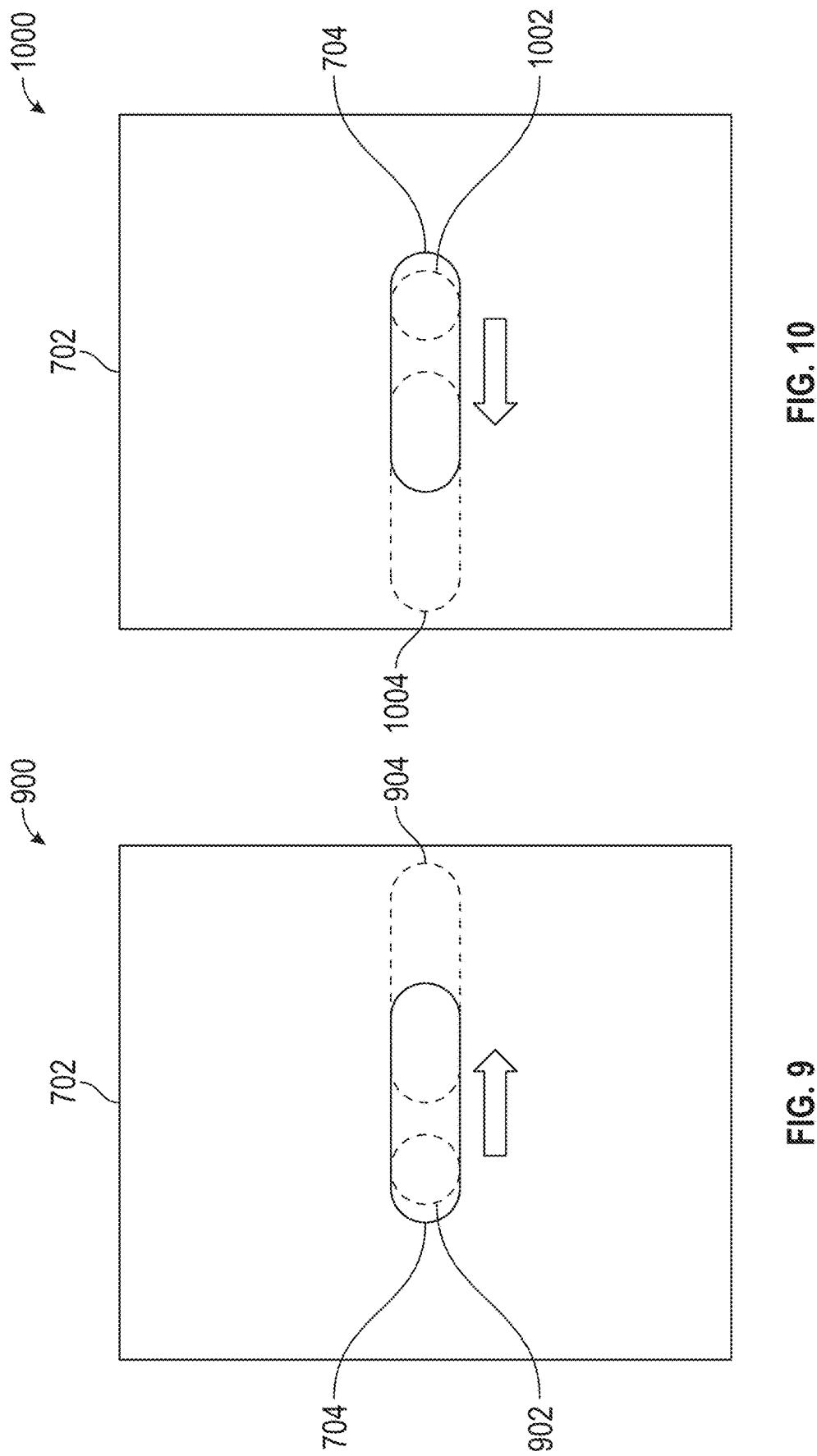
FIG. 9 shows a head-on view of the screen illustrating entry of a right lane change command when the convertible interface is operating in a touch mode.
FIG. 10 shows a head-on view of the screen illustrating entry of a left lane change command when the convertible interface is operating in a touch mode.

FIG. 9 shows a head-on view 900 of the screen 702 illustrating entry of a right lane change command when the convertible interface 210 is operating in a touch mode. The operator places his finger on the position icon 704 and slides his finger to the right. The position icon 704 converts to a dot 902 with a bar 904 to its right in order to provide a visual representation of the "right lane change" command. This command is provided to the controller 34.

FIG. 10 shows a head-on view 1000 of the screen 702 illustrating entry of a left lane change command when the convertible interface 210 is operating in a touch mode. The operator places his finger on the position icon 704 and slides his finger to the left. The position icon 704 converts to a dot 1002 with a bar 1004 to its left in order to provide a visual representation of the "left lane change" command. This command is provided to the controller 34.

Figures 11, 12:
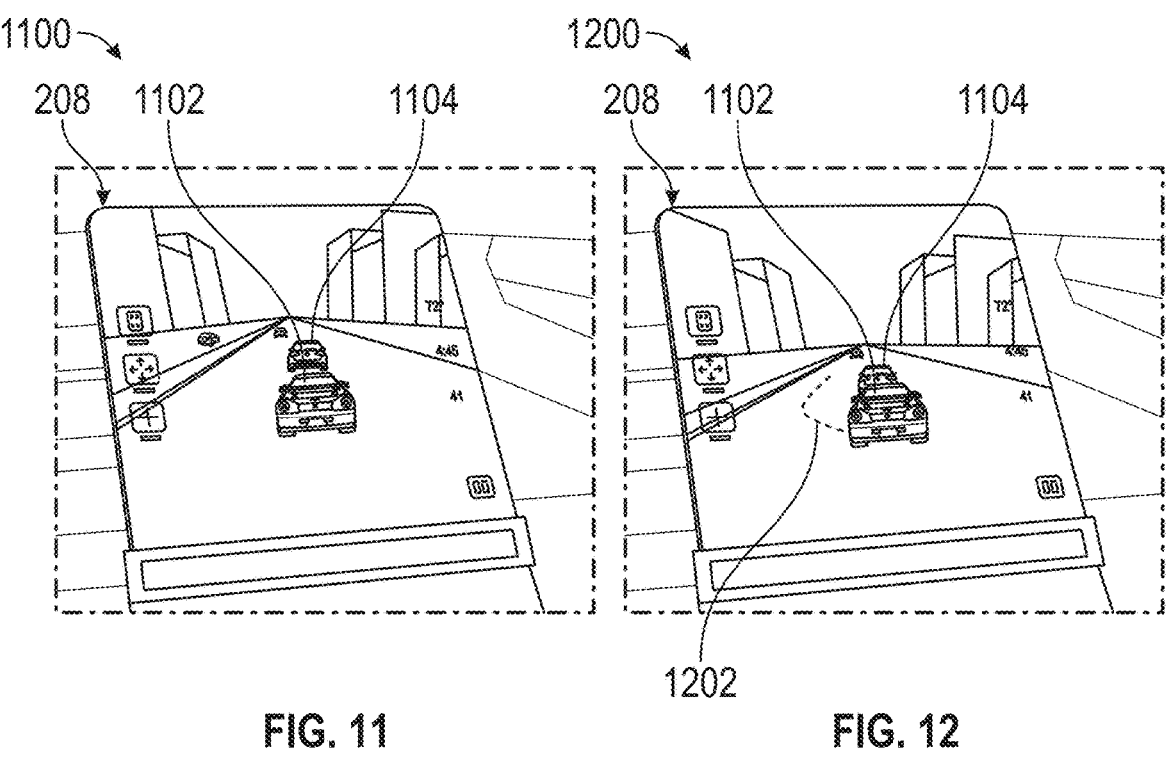
FIG. 11 is a view of the display showing a current driving environment for the vehicle.
FIG. 12 is a view of the display receiving an illustrative command from the operator.
Figures 13, 14:
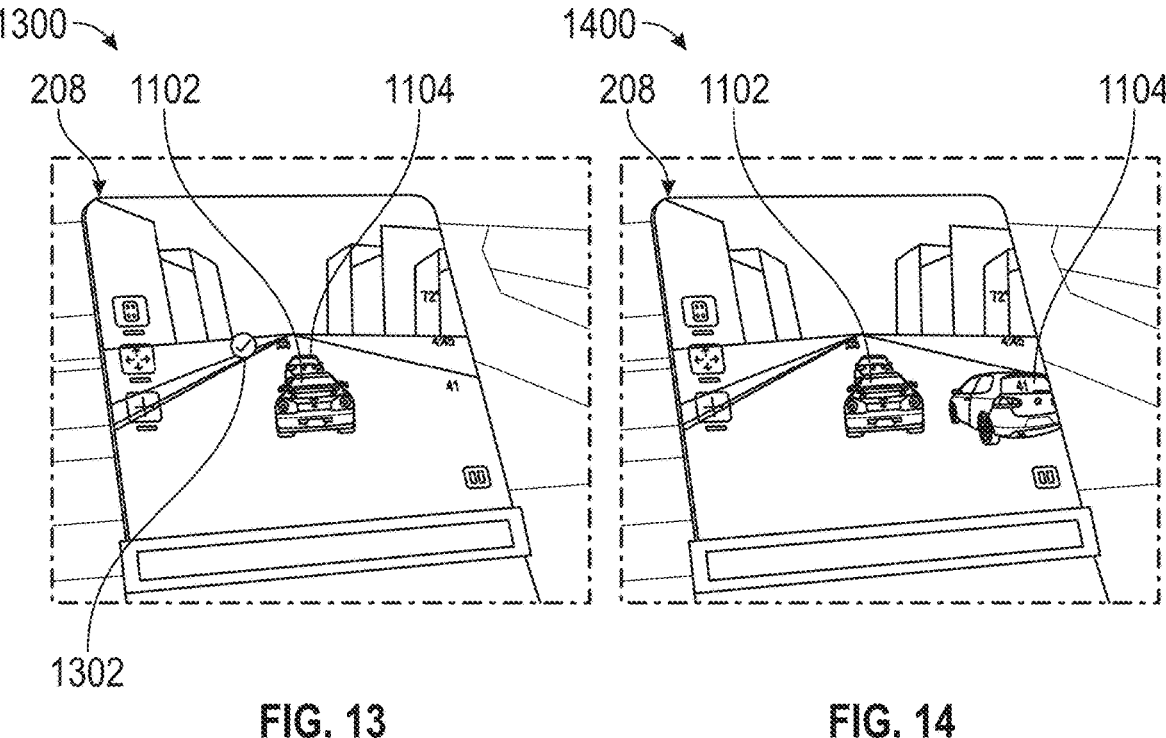
FIG. 13 is a view of the display confirming receipt of the command.
FIG. 14 is a view of the display after the command is entered.

FIGS. 11-14 show a sequence of images illustrating command entry at the display 208 of the human machine interface. FIG. 11 is a view 1100 of the display 208 showing a current driving environment for the vehicle. The display 208 is capable of receiving commands via a touchscreen operation. As illustrated, the current driving environment shows a host vehicle icon 1102 (representing the autonomous vehicle 10) and a remote vehicle icon 1104. The remote vehicle icon 1104 is in front of the host vehicle icon 1102. FIG. 12 is a view 1200 of the display 208 receiving an illustrative command from the operator. The operator draws a vehicle maneuver 1202 on the display 208. The maneuver shown in FIG. 12 is a request to overtake the remote vehicle icon 1104 by passing it on the left. FIG. 13 is a view 1300 of the display 208 confirming receipt of the command. A check mark 1302 appears on the display 208 to confirm that the command has been entered. FIG. 14 is a view 1400 of the display 208 after the command is entered. The host vehicle icon 1102 is shown passing on the left side the remote vehicle icon 1104.

Figure 15:
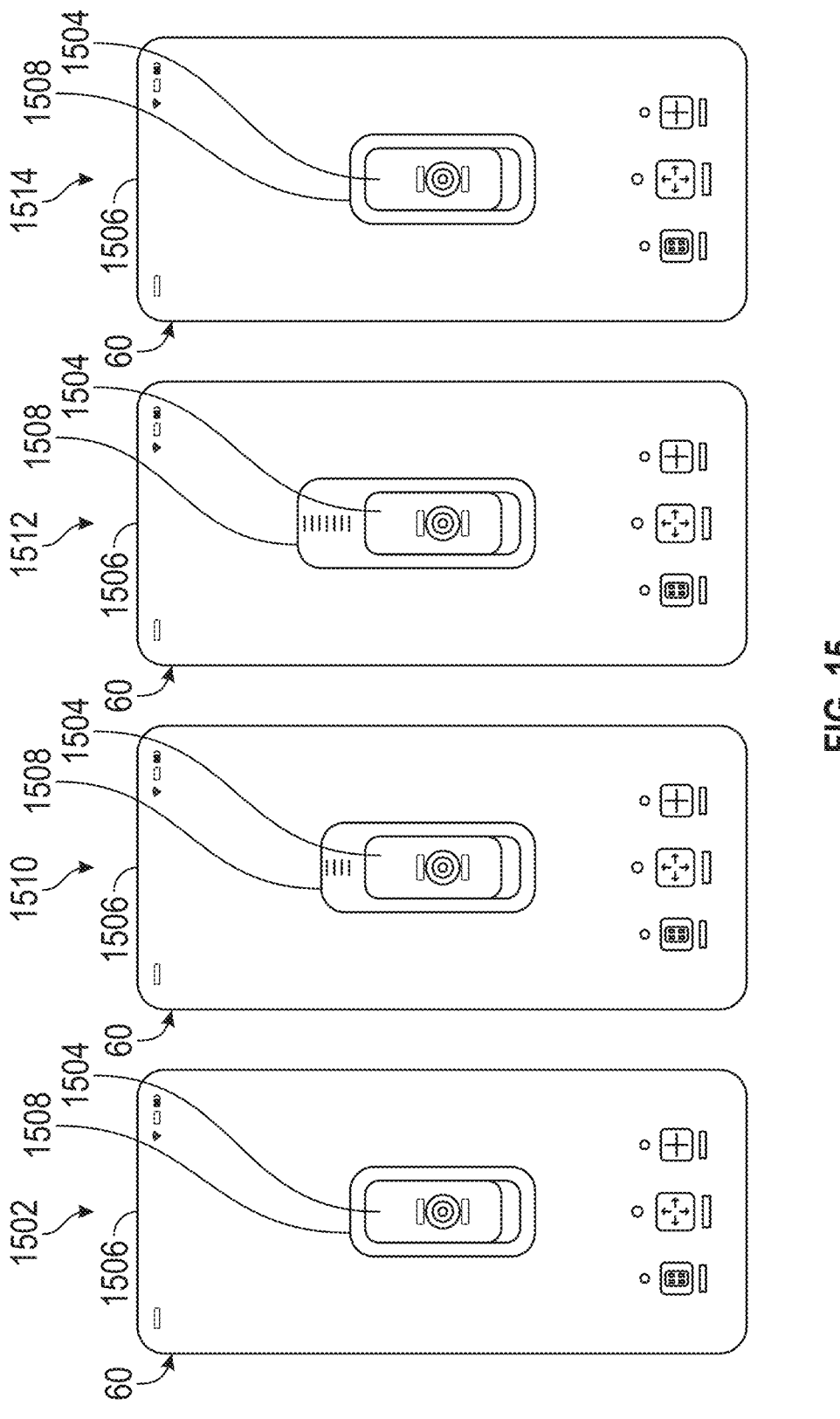
FIG. 15 shows screenshots of a remote communication device that can be used to control the autonomous vehicle.

FIG. 15 shows screenshots of a remote communication device 60 that can be used to control the autonomous vehicle 10. The remote communication device 60 can be a smartphone having a processor that runs an application that that can communicate with the autonomous vehicle 10. A first screen shot 1502 shows a vehicle icon 1504 located at a center of a remote screen 1506 of the smartphone. An envelope 1508 surrounds the vehicle icon 1504. The envelope 1508 can be manipulated by the operator to input a command to the autonomous vehicle 10. The envelope 1508 is activated by performing a long press on the vehicle icon 1504 and dragging forward or backward (thereby stretching the envelope 1508) to change the speed of the vehicle. In a second screen shot 1510, the envelope 1508 is stretched in the direction in front of the vehicle icon 1504 to input a command for an acceleration. The operator can stretch the envelope 1508 by placing his finger at a forward section of the envelope and dragging the front of the envelope forward. The amount of acceleration requested is related to the amount by which the front of the envelope 1508 is dragged forward in front of the vehicle icon 1504. Similarly, dragging the back of the envelope 1508 backward behind the vehicle icon can be used to input a command for a deceleration. In a third screen shot 1512, the operator has released his finger from the remote screen 1506 to have the command entered. In the fourth screen shot 1514, the envelope 1508 returns to its original shape (as in the first screen shot 1502) after the command has been entered.

The screenshots of FIG. 15 illustrate a sequence for entering an acceleration command. The acceleration command is entered by dragging the front end of the envelope forward or away from the vehicle icon 1504. Similarly, a deceleration command can be entered by dragging a rear end of the envelope backward or away from the vehicle icon 1504. Also, a left lane change can be entered by dragging a left side of the envelope to the left, and a right land change can be entered by dragging a right side of the envelope to the right.

Figure 16:
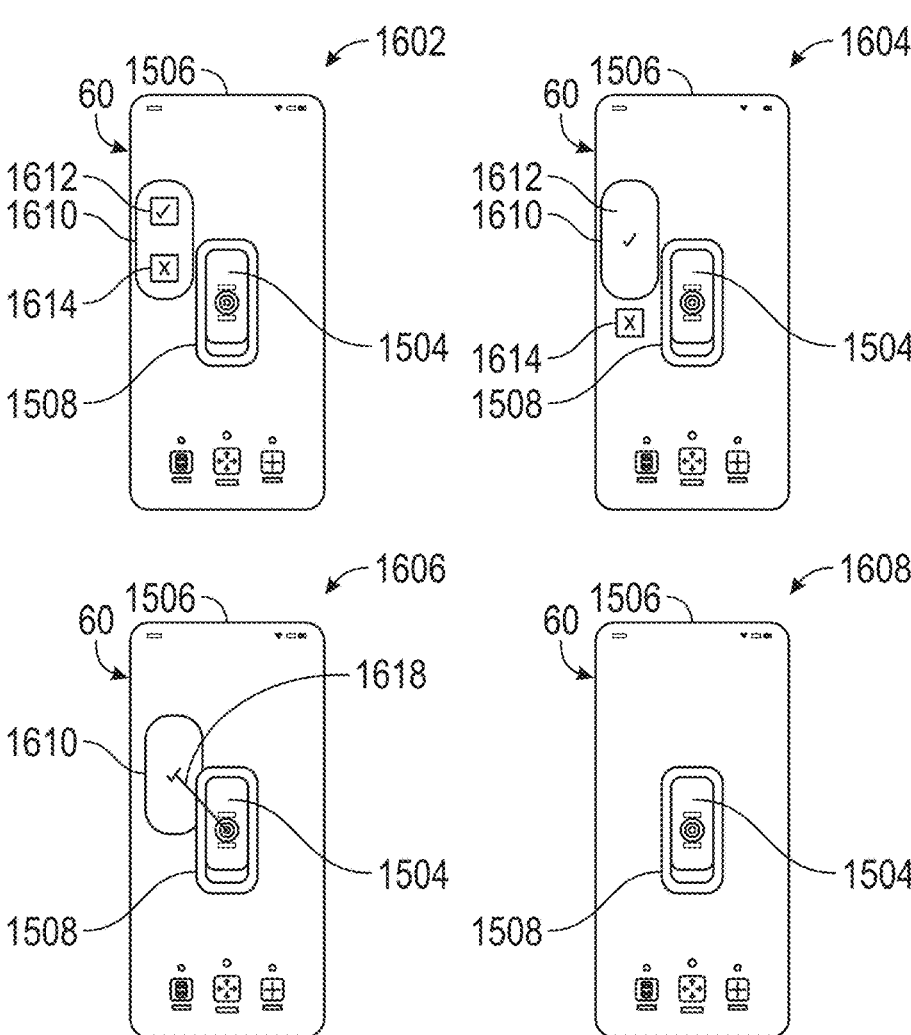
FIG. 16 shows screenshots of the remote communication device illustrating entry of a left lane change command.

FIG. 16 shows screenshots of the remote communication device 60 illustrating entry of a left lane change command. A first screen shot 1602 shows the vehicle icon 1504 and envelope 1508. Bubble 1610 is shown to a left side of the vehicle icon 1504. Bubble 1610 appears when the operator performs a large press on a desired new position of the vehicle (i.e., lane change, pass car, park on grass, etc.) within the screen. The bubble 1610 is shown as selecting a left lane change command for illustrative purposes. The bubble 1610 includes a first check box 1612 for selecting the left lane change (i.e., for confirming the action) and a second check box 1614 for rejecting the left lane change (i.e., for canceling the action). The first check box 1612 and the second check box 1614 have about the same dimensions on the remote screen 1506. A second screen shot 1604 shows a state of the remote screen 1506 once the operator selects the left lane change command. The first check box 1612 is shown to have a bigger area on the remote screen 1506 than the second check box 1614. A third screen shot 1606 shows a confirmation screen of the left lane change command. If the autonomous vehicle 10 deems the action safe then the vehicle icon 1504 will lasso itself into bubble 1610 along the line 1618 to indicate acceptance of the left lane change command (or other suitable action). A fourth screen shot 1608 shows the remote screen 1506 after the command has been entered. The remote screen 1506 shows a default view of the vehicle icon 1504 and the envelope 1508.

Figure 17:
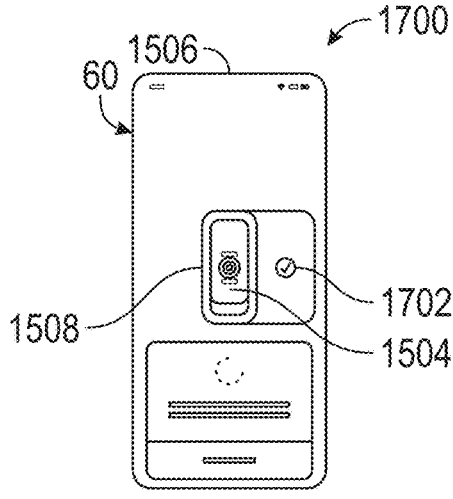
FIG. 17 shows a screenshot illustrating a parallel parking maneuver.

FIG. 17 shows a screenshot 1700 illustrating a parallel parking maneuver. A space icon 1702 appears to one side of the vehicle icon 1504 on the remote screen 1506 to indicate an open parking space. The operator can select the space icon 1702 to enter a command to parallel park in the parking space. The screenshot 1700 shows that there is sufficient safe space for occupants to exit after the vehicle has parked. This can be useful for passengers with disabilities that may require extra room when entering or exiting the vehicle. The area will be reserved and communicated to other vehicles as "occupied" until the vehicle leaves.

Figure 18:
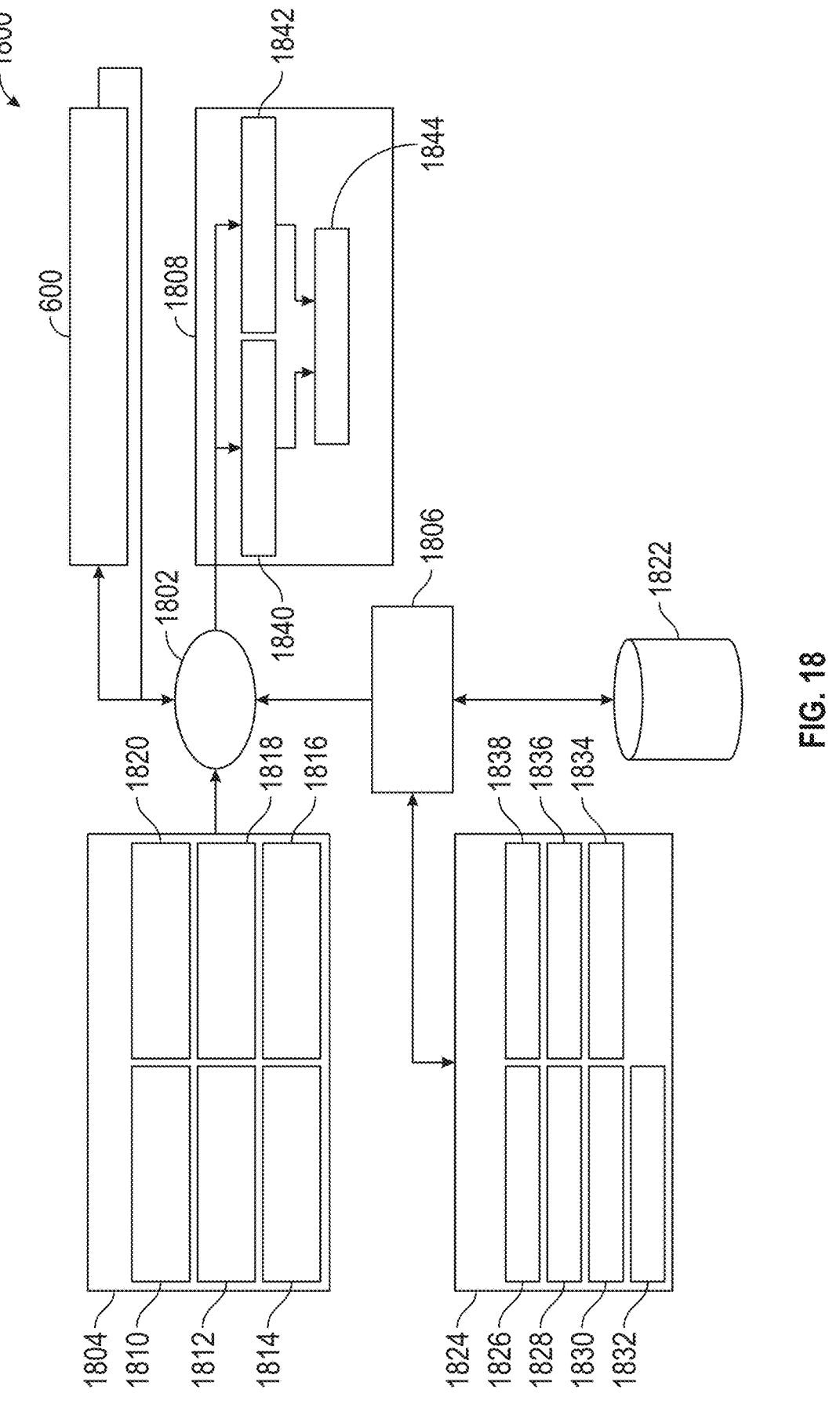
FIG. 18 shows a diagram of components of the autonomous vehicle.

FIG. 18 shows a diagram 1800 of components of the autonomous vehicle 10. The components include an on-board computer 1802 coupled to on-board sensors 1804, a data communication network 1806 and system output 1808. The on-board sensors 1804 can include, but are not limited to, the automated driving system 1810, external cameras and sensors 1812, vehicle braking sensors 1814, vehicle acceleration sensors 1816, steering angle sensors 1818 and the human machine interface 1820. The human machine interface 1820 provides the commands discussed herein to the on-board computer 1802 based on touch gestures and/or surface motion gestures.

The data communication network 1806 connects the on-board computer 1802 to data servers 1822 and off-board input devices 1824. The off-board input devices 1824 can include, but are not limited to, a Global Positioning Satellite (GPS) system 1826, a traffic signal system 1828, a cellular communication network 1830, a weather data server 1832, a WiFi communication system 1834, a road database server 1836 and V2X (vehicle to everybody) communications 1838. The data servers 1822 can provide traffic information, etc.

The on-board computer 1802 performs algorithms for determining a operator's command input. The on-board computer 1802 also can generate haptic signals that can be used to generate a haptic signal at a display 1840 or a haptic signal at a joystick 1842. The haptic signal can be used to indicate a vehicle control 1844.

Figure 19:
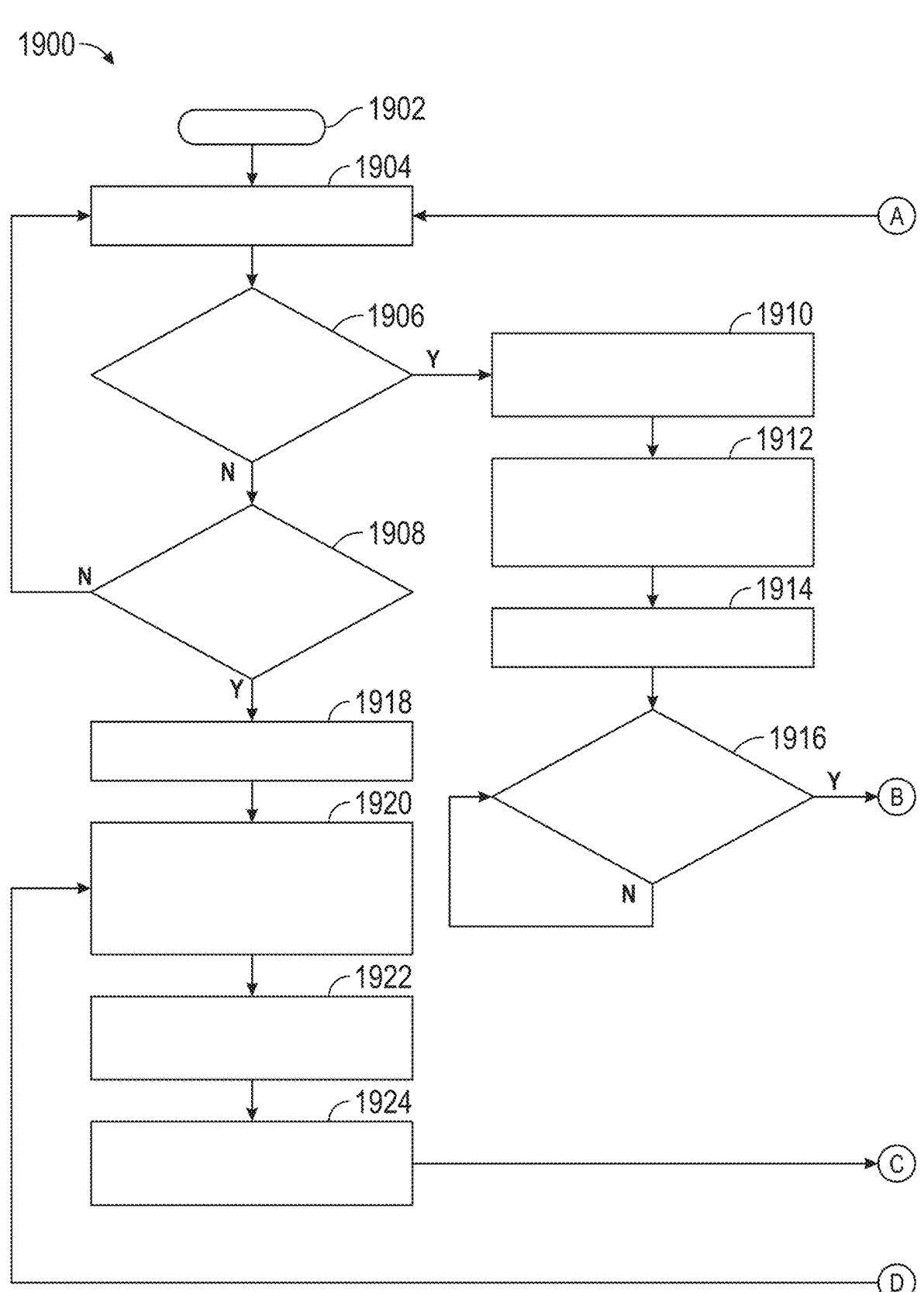
FIG. 19 is a flowchart of a method for controlling the vehicle using the human machine interface disclosed herein.
Figure 19:
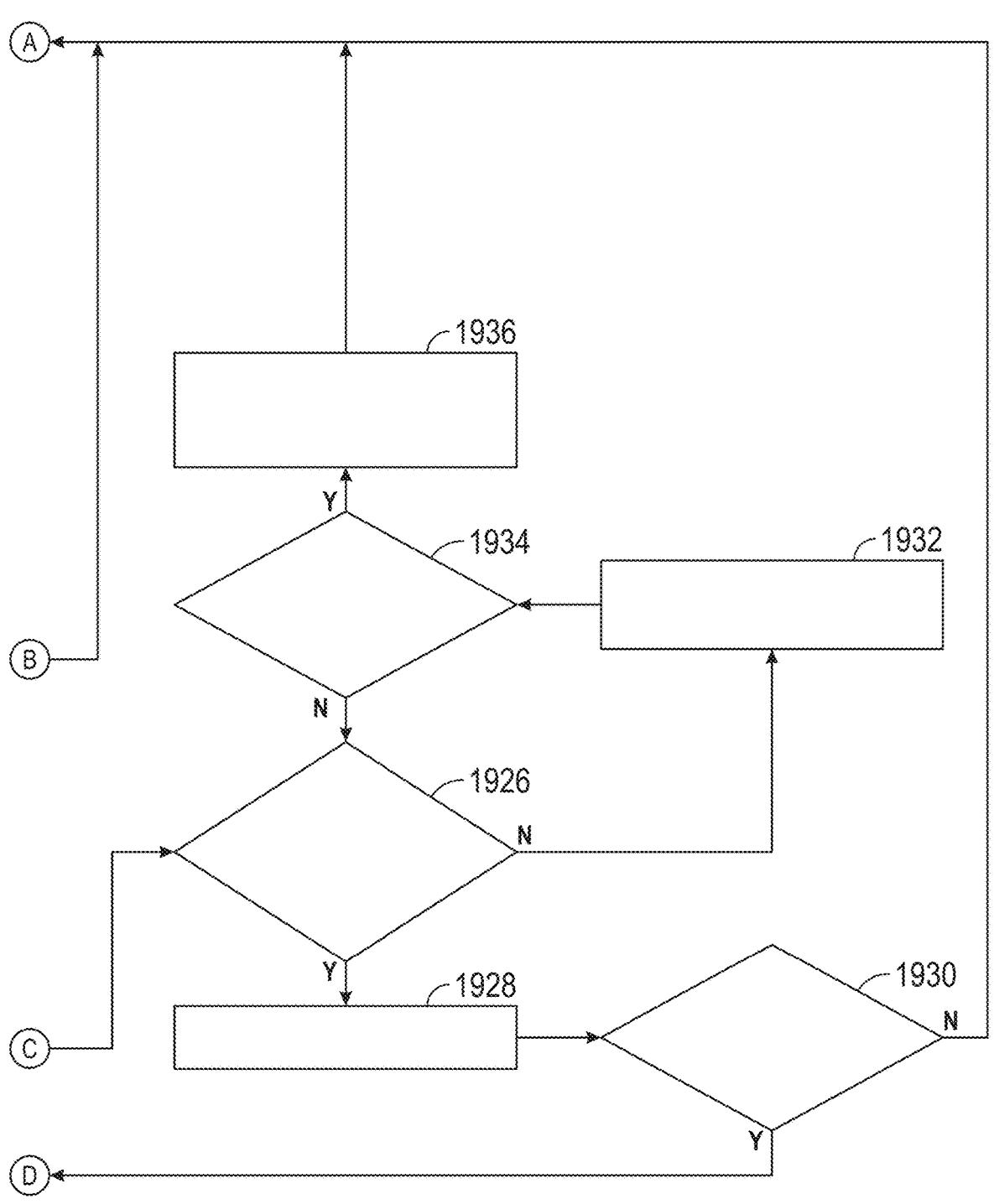

FIG. 19 is a flowchart 1900 of a method for controlling the vehicle using the human machine interface disclosed herein. The method starts at box 1902. At box 1904, the operator rides in the vehicle operating in an autonomous mode.

At box 1906, the processor monitors input to determine whether the operator desires to take manual control of the vehicle for manual driving. The input can be an instruction in the form of a touch at a selected location on a screen or surface of the human interface, etc. If the operator does not desire to assume control, the method proceeds to box 1908. In box 1908, the processor monitors input to determine whether the operator desires to enter a command for adjusting automated driving of the vehicle. If there is no input indicating a desire to enter a command, the method returns to box 1904.

Returning to box 1906, if the operator desires to assume control, the method proceeds to box 1910. In box 1910, the operator presses a place on the display to select a joystick control. In box 1912, the processor deploys the joystick for the vehicle, raising the joystick above the flush plane of the interface. In box 1914, the operator controls the vehicle using the joystick. In box 1916, the processor determines if the operator desires to return to automated driving, based on an input of the operator. If no input is received that indicates the operator wishes to return to automated driving the method loops back onto itself. If the operator desires to return to automated driving, the method returns to box 1904.

Returning now to box 1908, if the operator desire to enter commands to the autonomous vehicle, the method proceeds to box 1918. In box 1918, the operator touches the screen of the convertible interface and performs a gesture at the screen. In box 1920, the processor determines various parameters of the gesture, such as a location of the gesture at the convertible interface, a trajectory vector for the gesture, a speed of the gesture, an orientation of the gesture, etc. In box 1922, the processor updates an icon at the screen and generates appropriate haptic feedback. In box 1924, the processor determines the vehicle command being requested by the operator.

In box 1926, the processor determines if the current traffic conditions allow the vehicle to perform the command. If current traffic conditions are favorable, the method proceeds to box 1928. In box 1928, the processor performs the command. In box 1930, the processor determines whether the operator is commanding an additional maneuver. If an additional maneuver is being commanded, the method returns to box 1920. Otherwise, the method proceeds to box 1904.

Returning to box 1926, if the traffic conditions are not favorable to the vehicle performing the command, the method proceeds to box 1932. In box 1932, the vehicle waits for a selected wait time for the traffic conditions to improve to where the command can be executed at the vehicle. In box 1934, the wait time is compared to a time threshold. If the wait time is less than the time threshold, the method returns to box 1926. Otherwise, the method proceeds to box 1936. In box 1936, the vehicle displays an output to the operator to communicate that the command could not be executed. The method then returns to box 1904.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An apparatus for operation of an autonomous vehicle, comprising:
   a convertible interface including a rod having a first end and a second end, a touch-sensitive surface connected to the rod at the first end, and a universal joint connected to the rod at the second end, wherein the rod is configured to rotate about the universal joint; and
   a deployment mechanism coupled to the convertible interface, the deployment mechanism configured to move the convertible interface between a first position and a second position, wherein, in the first position, the touch-sensitive surface receives a command when an operator moves a pointing device along the touch-sensitive surface in a gesture that indicates the command, and, in the second position, the convertible interface receives the command when the operator moves the touch-sensitive surface to cause a rotation at the universal joint that indicates the command.

2. The apparatus of claim 1, wherein the touch-sensitive surface is flush with a display surface of a human machine interface when the convertible interface in the first position and the touch-sensitive surface is raised to a selected distance above the display surface when the convertible interface in the second position.

3. The apparatus of claim 1, further comprising a haptic actuator coupled to the universal joint for generating a haptic signal to acknowledge receipt of the command from the operator.

4. The apparatus of claim 1, wherein the touch-sensitive surface is turned on when the convertible interface is in the first position and is turned off when the convertible interface is in the second position.

5. The apparatus of claim 1, further comprising a potentiometer configured to generate a signal in response to the rotation of the universal joint about an axis, wherein the signal is indicative of the command.

6. The apparatus of claim 1, further comprising a processor configured to perform a maneuver at the autonomous vehicle indicated by the command entered at the convertible interface.

7. The apparatus of claim 6, further comprising a communication device for sending signals between the processor and a remote communication device, wherein the operator can enter the command at the remote communication device.

8. A human machine interface for an autonomous vehicle, comprising:
   a display surface having a screen;
   a convertible interface movable with respect to the display surface, the convertible interface including a rod having a first end and a second end, a touch-sensitive surface connected to the rod at the first end, and a universal joint connected to the rod at the second end, wherein the rod is configured to rotate about the universal joint; and
   a deployment mechanism coupled to the convertible interface, the deployment mechanism configured to move the convertible interface between a first position and a second position, wherein, in the first position, the touch-sensitive surface receives a command when an operator moves a pointing device along the touch-sensitive surface in a gesture that indicates the command, and, in the second position, the convertible interface receives the command when the operator moves the touch-sensitive surface to cause a rotation at the universal joint that indicates the command.

9. The human machine interface of claim 8, wherein the touch-sensitive surface is flush with a display surface of the human machine interface when the convertible interface in the first position and the touch-sensitive surface is raised to a selected distance above the display surface when the convertible interface in the second position.

10. The human machine interface of claim 8, further comprising a haptic actuator coupled to the universal joint for generating a haptic signal to acknowledge receipt of the command from the operator.

11. The human machine interface of claim 8, wherein the touch-sensitive surface is turned on when the convertible interface is in the first position and is turned off when the convertible interface is in the second position.

12. The human machine interface of claim 8, further comprising a potentiometer configured to generate a signal in response to the rotation of the universal joint about an axis, wherein the signal is indicative of the command.

13. The human machine interface of claim 8, further comprising a communication device for sending signals between a processor of the autonomous vehicle and a remote communication device, wherein the operator can enter the command at the remote communication device.

14. The human machine interface of claim 8, wherein the screen is touch sensitive for receiving the command from the operator.

15. A vehicle, comprising:
  a processor configured to control an operation of the vehicle based on a command from an operator;
  a human machine interface configured to receive the command from the operator, the human machine interface including:
  a display surface having a screen;
  a convertible interface movable with respect to the display surface, the convertible interface including a rod having a first end and a second end, a touch-sensitive surface connected to the rod at the first end, and a universal joint connected to the rod at the second end, wherein the rod is configured to rotate about the universal joint; and
  a deployment mechanism coupled to the convertible interface, the deployment mechanism configured to move the convertible interface between a first position and a second position, wherein, in the first position, the touch-sensitive surface receives the command when an operator moves a pointing device along the touch-sensitive surface in a gesture that indicates the command, and, in the second position, the convertible interface receives the command when the operator moves the touch-sensitive surface to cause a rotation at the universal joint that indicates the command.

16. The vehicle of claim 15, wherein when the convertible interface in the first position, the touch-sensitive surface is flush with the display surface and when the convertible interface in the second position, the touch-sensitive surface is raised to a selected distance above the display surface.

17. The vehicle of claim 15, further comprising a haptic actuator coupled to the universal joint for generating a haptic signal to acknowledge receipt of the command from the operator.

18. The vehicle of claim 15, wherein the touch-sensitive surface is turned on when the convertible interface is in the first position and is turned off when the convertible interface is in the second position.

19. The vehicle of claim 15, further comprising a potentiometer configured to generate a signal in response to the rotation of the universal joint about an axis, wherein the signal is indicative of the command.

20. The vehicle of claim 15, further comprising a communication device for sending signals between the processor and a remote communication device, wherein the operator can enter the command at the remote communication device.

*    *    *    *    *